United States Patent [19]
Smith

[11] 3,783,523
[45] Jan. 8, 1974

[54] TIRE CALIPER

[76] Inventor: Ivan O. Smith, 1353 Acacia St., San Bernadino, Calif. 92405

[22] Filed: Nov. 30, 1971

[21] Appl. No.: 203,154

[52] U.S. Cl........... 33/203.13, 33/143 D, 33/203.12
[51] Int. Cl........................... G01b 5/08, G01b 5/20
[58] Field of Search............. 33/143 D, 203, 203.11, 33/203.12–203.16, 203.18–203.21, 143 K, 143 M, 174 R; 73/146

[56] References Cited
UNITED STATES PATENTS

| | | | |
|---|---|---|---|
| 2,566,435 | 9/1951 | Trimmer | 33/143 D |
| 2,516,497 | 7/1950 | Wilson | 33/203.15 |
| 3,546,782 | 12/1970 | Pereve et al. | 33/203.13 |
| 3,411,346 | 11/1968 | Gagliardi | 33/203.13 |
| 2,566,407 | 9/1951 | Evans | 33/143 D |
| 2,841,874 | 7/1958 | Richardson | 33/143 D |

Primary Examiner—Stanley N. Gilreath
Assistant Examiner—Jon W. Henry
Attorney—Herbert E. Kidder

[57] ABSTRACT

A tire caliper comprising a tire-engaging member having two parallel posts extending perpendicularly therefrom. At their other ends, the posts are connected by a bridge-like member which is secured by tight-fitting bolts screwed into plugs inserted into the ends of the posts, so as to prevent twisting of the posts. A sleeve-like head is slidably mounted on one of the posts, and projecting laterally from one side thereof is a caliper arm. A pair of guide fingers project from the other side of the head and slidably engage the other post on opposite sides thereof to keep the head from turning. A graduated scale is fixed to said other post on the side facing said one post, and a pointer on the head indicates on the scale the outside diameter of a tire engaged on one side by said member and on the other side by said caliper arm.

2 Claims, 14 Drawing Figures

PATENTED JAN 8 1974 3,783,523

INVENTOR.
IVAN O. SMITH
BY Herbert E. Kidder
AGENT

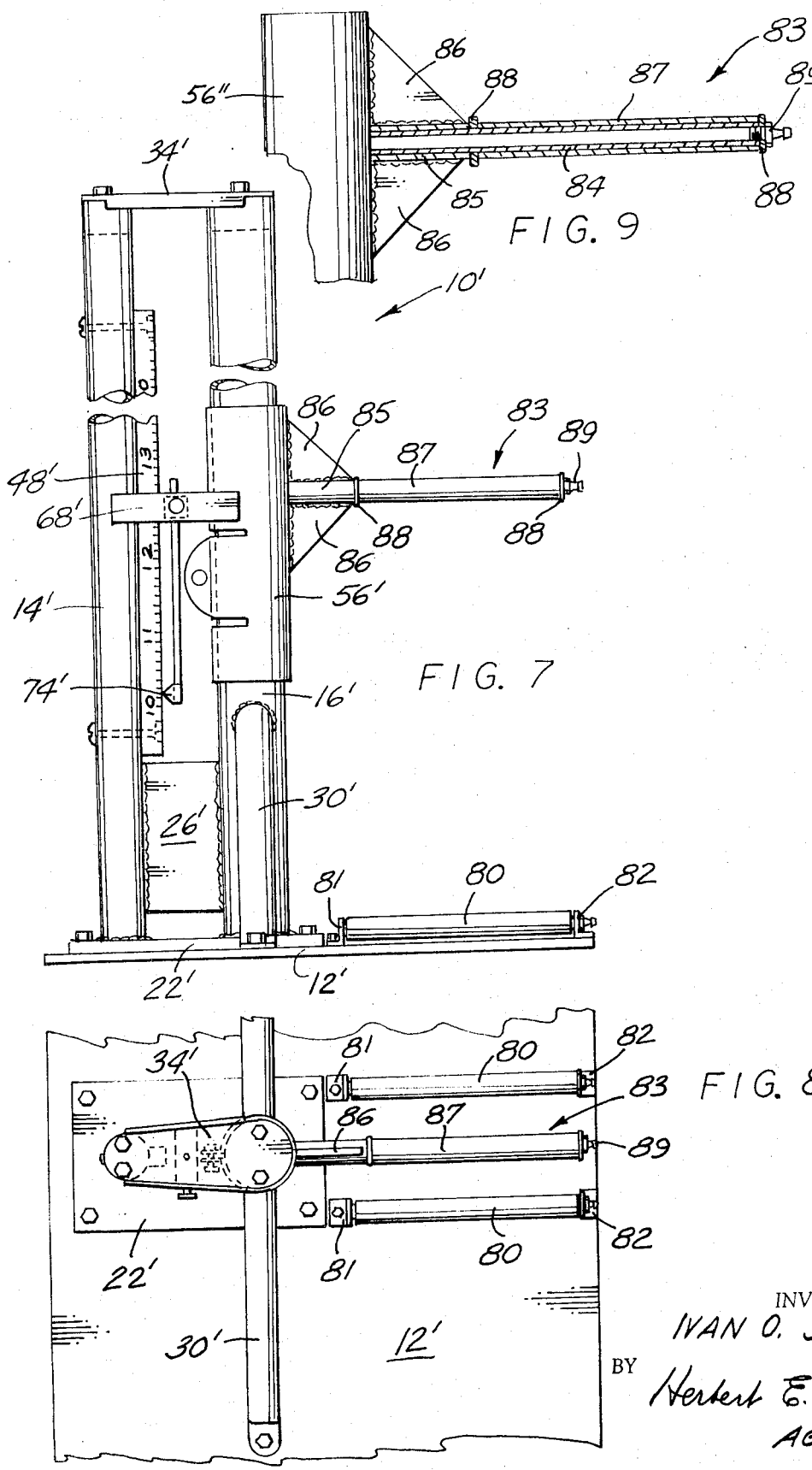

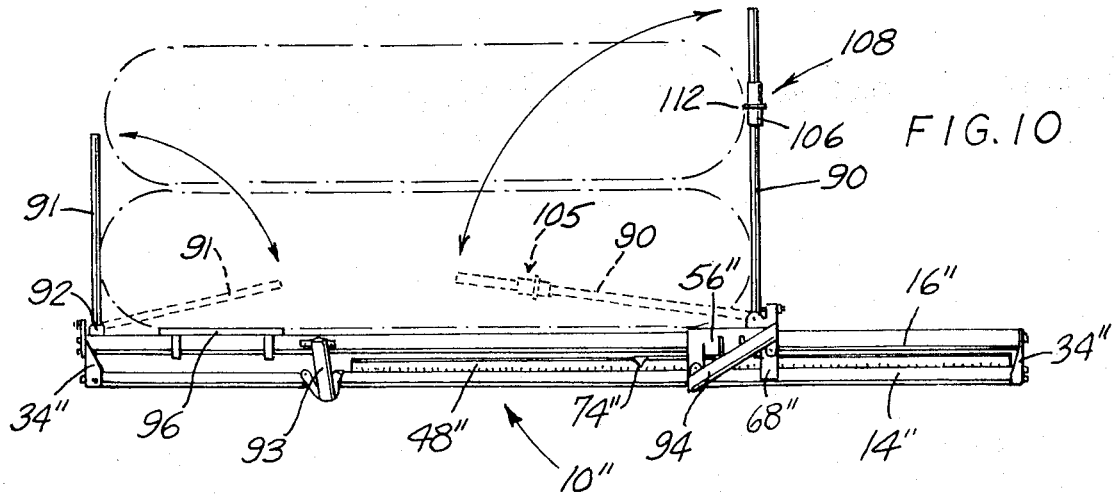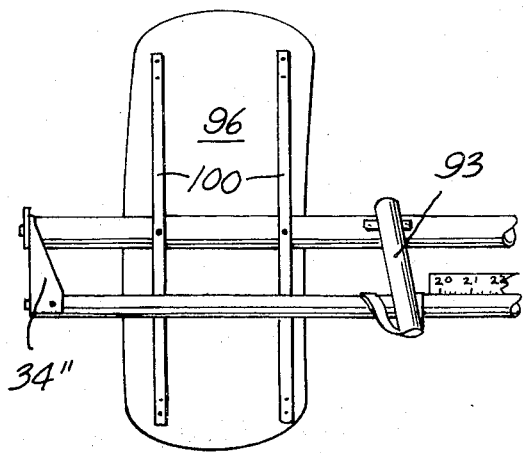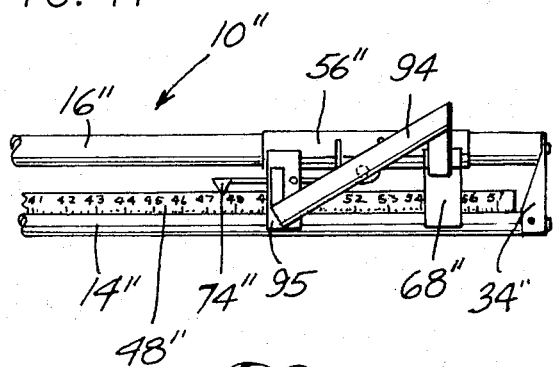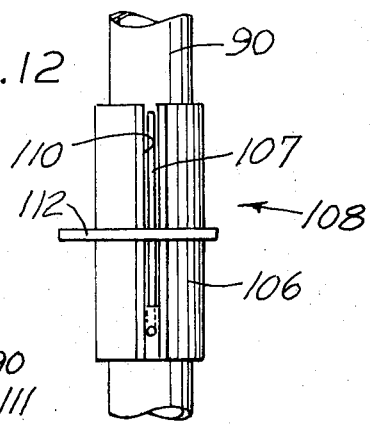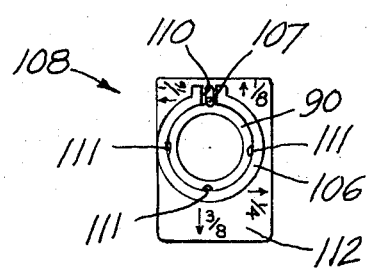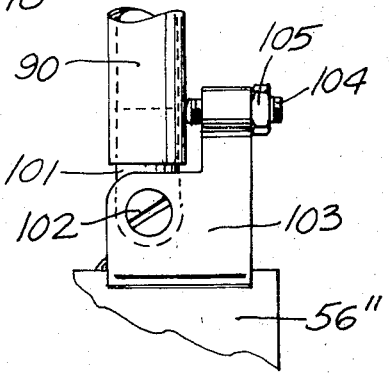

TIRE CALIPER

BACKGROUND OF THE INVENTION

The present invention pertains to a tire caliper for measuring the outside diameter of tires, particularly for the purpose of matching tires that are used in pairs, as in the case of tandem or dual axles on trucks or other heavy vehicles. Where tires are used in pairs, it is extremely important that they be matched so that their outside diameters are preferably within one-eighth inch of being the same. This is to avoid overloading of the over-size tires, and also to prevent overheating and excess wear of the truck rear end. Whenever tires are changed or rotated, it is essential that the two tires of any pair be matched as closely as possible, and anytime that there is a difference of one-quarter inch or more in their diameters, one of the tires should be replaced by another which more closely matches the other. With regular matching maintenance, tires can be properly rotated to give the utmost performance in tread wear and equipment efficiency, and the operators of trucks or heavy vehicles can correct and control any mismatched dual tire condition which may result from uneven wear due to slight differences in inflation pressures or tread toughness, misalignment, or any of several other factors that cause one tire to wear faster than the other.

It is also important that tires be checked periodically for roundness, so that any tires which have worn out-of-round, can be trued up before being mounted on a truck axle. Therefore, one embodiment of the invention pertains to a tire caliper particularly designed for checking the roundness of tires.

SUMMARY OF THE INVENTION

The primary object of the present invention is to provide an improved tire caliper for quickly and easily measuring the outside diameter of tires to be used on dual axles, so that tires can be matched in pairs that are preferably within one-eighth inch of being the same diameter.

Another object of the invention is to provide a tire caliper that is simple and convenient to use, and extremely accurate. In this connection, one feature of the invention is that means is provided for quickly and easily re-calibrating the device if it should ever be strained or damaged in any way, or if the graduated scale should have to be replaced with another.

Another object of the invention in one of its embodiments is to provide a portable tire caliper that is compact and light in weight, so that it can be carried in a truck cab for measuring tires while on the road, thereby enabling the operator to specify the exact diameter tire needed to match another tire on a dual axle, when calling in to the service department for a replacement tire to be sent out to him.

Another object of the invention in still another of its embodiments is to provide a tire caliper for checking the roundness of tires, so that out-of-round tires can be trued up before being mounted on a dual axle.

A further object of the invention is to provide a device of the class described that is simple and inexpensive to manufacture; ruggedly built, with nothing to get out of order; and lightweight and compact, so that it can be transported readily from one place to another, wherever needed.

These objects are achieved by providing a tire caliper comprising a tire-engaging member which is placed against one side of a tire, and a pair of parallel posts extending perpendicularly from said member. The two posts are rigidly connected together at their top and bottom ends, and are solidly connected to the said member and braced with respect thereto. Slidably mounted on the front post is a sleeve-like head carrying a caliper arm that overhangs the said tire-engagement member and is perpendicular to the post. A pair of guide arms are fixed to the head on opposite sides thereof and slidably engage the rear post on either side thereof. A graduated scale is attached to the rear post on the side facing the front post, and a pointer on the head indicates on the scale the exact diameter of a tire engaged on one side by said member and touched on the other side by the caliper arm.

In one embodiment of the invention, the said tire-engaging member comprises a base plate which rests on the ground, and this allows tires to be rolled up to the caliper and measured while standing on the base plate. The tires do not have to be lifted from the ground, nor do they have to be laid down to be measured. Since the tires are quite heavy, especially when mounted on wheels, it is important that they be measured while standing on their treads, and that they require no more handling than merely rolling them on their treads.

In another embodiment of the invention, the said tire-engaging member comprises an arm that is swingable between a first, tire-engaging position perpendicular to the post, and a second, transport position lying flat against the posts. By this arrangement, the tire-caliper folds flat, and forms a compact unit that can easily be carried in the truck cab.

In a third embodiment of the invention used for checking the roundness of tires, the tire-engaging member comprises a pair of parallel rollers on which the tire is rested. The tire is then rotated in place on the rollers, and movement of the caliper arm is noted as it follows any out-of-roundness of the tire.

With a regular program of tire gauging nad matching tires to within one-eighth inch of the same diameter, using the invention, it is possible to obtain increased tire efficiency on dual-wheeled trucks or heavy vehicles, with maximum tread mileage and carcass life. Overloading of over-size tires is eliminated, and excessive strain and wear on the truck rear end is reduced, with a corresponding reduction of repair expenses.

The foregoing and other objects and advantages of the invention will become apparent to those skilled in the art from the following detailed description of the preferred embdiments thereof, with reference to the accompanying drawings.

BRIEF DESCRIPTION OF THE DRAWINGS:

FIGS. 7 to 9 show another embodiment of the invention, in which:

FIG. 7 is a side elevation that has been cut out in part to reduce the overall height of the drawing;

FIG. 8 is a top plan view of the same;

FIG. 9 is a partly sectioned, fragmentary view of the caliper arm, showing the freely rotatable roller;

FIGS. 10 to 14 show still another embodiment of the invention, in which FIG. 10 is a view looking downwardly, and showing the manner of using the same to check the diameter of one tire on a dual axle;

FIG. 11 is a side elevation of the same;

FIG. 12 is an enlarged fragmentary view of the rotatable gauge member that is slidingly mounted on the caliper arm;

FIG. 13 is an end view of the device shown in FIG. 12; and

FIG. 14 is an enlarged fragmentary elevational view of the hinge joint connecting the caliper arm to the sliding head.

DESCRIPTION OF THE PREFERRED EMBODIMENTS

Figure 6:
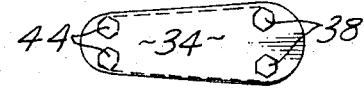
FIG. 6 is a top plan view of the bridge-like member connecting the top ends of the posts together.
Figure 1:
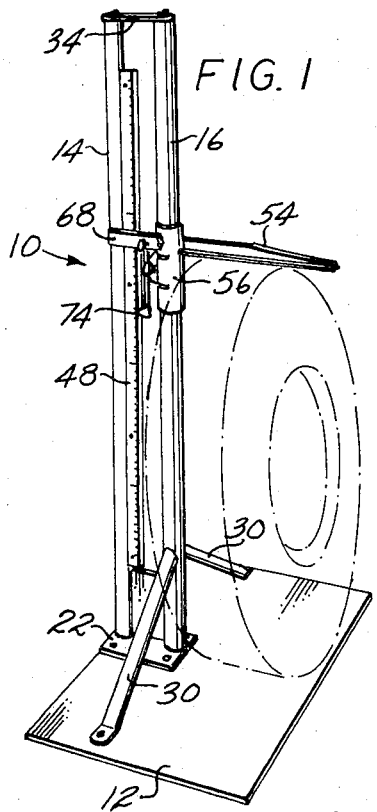
FIG. 1 is a perspective view of a tire caliper embodying the principles of the invention.
Figure 4:
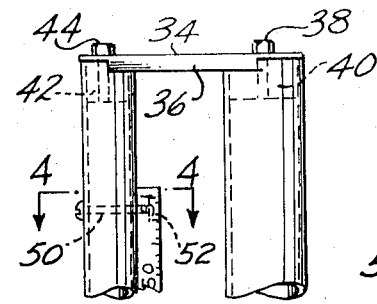
FIG. 4 is an enlarged sectional view, taken at 4—4 in FIG. 2.
Figure 4:
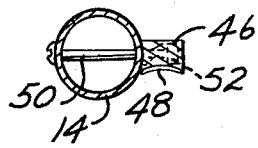
Figure 2:
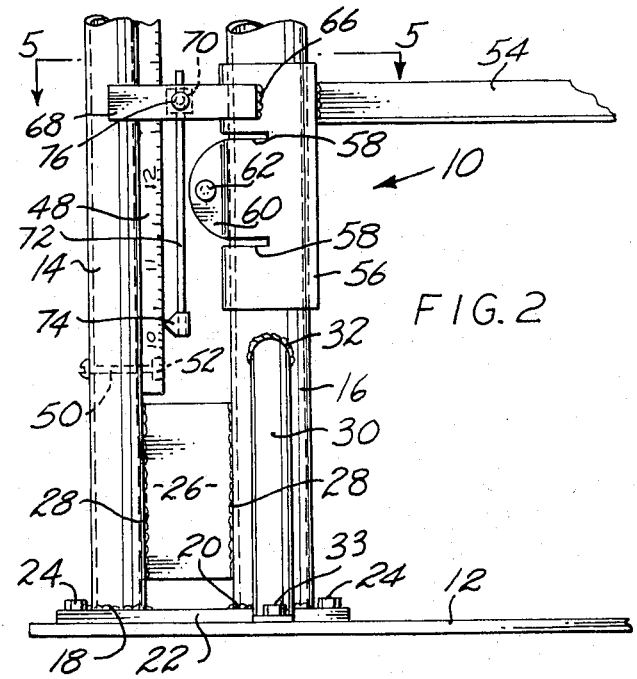
FIG. 2 is a side elevation of the same, cut out in part to reduce the overall height of the drawing.
Figure 3:
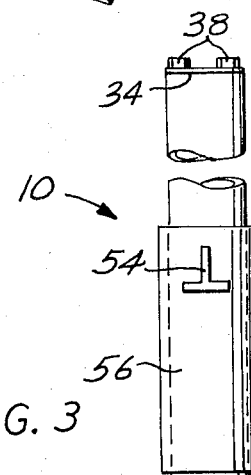
FIG. 3 is a front elevational view of the device, which is also cut out in part to reduce the height of the drawing.

In FIGS. 1 to 6 of the drawings, the tire caliper of the present invention is designated in its entirety by the reference numeral 10 and comprises a flat rectangular baseplate 12 having two cylindrical tubular posts 14 and 16 rising perpendicularly therefrom along one side edge near its midpoint. The posts 14, 16 are preferably made of steel tubing of 1 inch and 1½ inch outside diameters, respectively. The posts are spaced about 2 inches apart, and extend parallel to one another with the smaller diameter post 14 on the outside, and the larger diameter post 16 on the inside of the base plate. Posts 14 and 16 have their bottom ends welded at 18 and 20 to a foot plate 22, which is secured by four bolts 24 to the base plate 12. Posts 14 and 16 are also joined together at their lower ends by a rectangular bracing plate 26, to which the posts are welded on opposite sides at 28. Bracing plate 26 provides an extremely rigid connection between the bottom ends of posts 14 and 16, and prevents the posts from twisting or shifting in any direction with respect to one another.

Post 16 is also braced laterally at its lower end by two inclined tubular bracing members 30, the top ends of which are welded at 32 to opposite sides of the post. Members 30 extend downwardly and outwardly from the post 16 at an angle of about 45° to the latter, and their bottom ends are flattened and bent outwardly to lie flat against the top surface of base plate 12. The flattened ends of members 30 are secured to the base plate by bolts 33.

At their top ends, posts 14 and 16 are connected together by a bridge-like member 34 having downturned flanges 36 along both of its side edges. The opposite ends of member 34 overlie the top ends of posts 14, 16 and two laterally spaced machine screws 38 pass through holes in member 34 and are screwed into close-tolerance, tapped holes in a plug 40, that is driven into the end of post 16. A similar plug 42 is driven into the top end of post 14, and two laterally spaced machine screws 44 are screwed into close-tolerance, tapped holes in the plug. The plugs 40 and 42 are preferably welded or brazed into their respective posts, so as to prevent twisting or turning, and the bridge-like member 34 with its two pairs of machine screws 38 and 44 screwed into close-tolerance holes in the plugs 40, 42 provides a rigid connection between posts 14, 16 which prevents them from twisting or otherwise shifting with respect to one another.

Mounted on the front side of the rear post 14 and extending lengthwise thereof from just below bridge member 34 to a point just above the top edge of bracing post 26 is a strip 46 of wood or other material having a concave dish on one side (see FIG. 4) into which an arcuately curved measuring tape 48 is seated. Strip 46 is held to post 14 by two screws 50 which pass through aligned holes in opposite sides of the post and in the strip 46, and have nuts 52 screwed onto their ends. Nuts 52 are seated within counterbores provided in the front face of strip 46.

Figure 5:
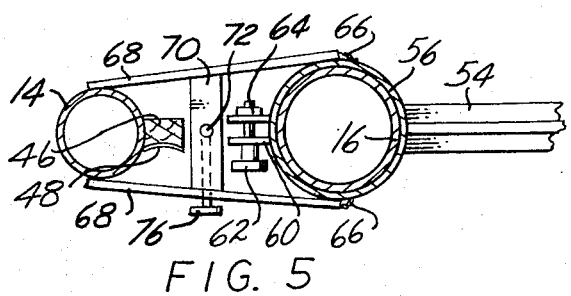
FIG. 5 is an enlarged sectional view, taken at 5—5 in FIG. 2.

Measuring of the outside diameter of a tire is done by a caliper arm 54, which projects horizontally from the front side of a sleeve-like head 56 slidably mounted on post 16. Caliper arm 54 is preferably made of inverted T-bar and projects perpendicularly from post 16 over the full width of base plate 12. Head 56 fits snugly over post 16 but slides freely thereon, and provision is made for clamping the head in any selected position. For this purpose, the head 56 has two transverse slits 58 cut through from the back side thereof, and the portion between the slits is divided and bent outwardly from the remainder to form side-by-side ears 60. A clamping screw 62 passes through aligned holes in the ears 60, and is screwed into a nut 64 (FIG. 5).

Welded at 66 to opposite sides of head 56 and projecting rearwardly therefrom are two guide arms 68, which pass on opposite sides of post 14 and slidably engage the latter. Guide arms 68 keep head 56 from turning on post 16, and keep the caliper arm 54 in the same vertical plane at all times. Bridging the space between guide arms 68 about midway between posts 14 and 16 is a cross-piece 70 which has a vertical hole formed therein at about its midpoint, and slidably disposed within this hole is a rod 72, which carries a pointer 74 at its bottom end. Pointer 74 points toward the graduations on scale 48, and scale 48 is so positioned on strip 46 that the distance indicated on the scale by pointer 74 represents the distance from the top surface of base plate 12 to the underside of caliper arm 54. Rod 72 is clamped to crosspiece 70 by means of a set screw 76.

The operation of this embodiment of the invention is as follows: The apparatus 10 is set up with base plate 12 resting on the ground. Head 56 is then moved up the post 16 until the pointer 74 reads a diameter (in inches) approximately equal to or slightly greater than the nominal diameter of the tire to be gauged. The wheel-mounted tire is rolled onto the base plate 12, and is held as closely perpendicular to the ground as possible, while head 56 is slid down the post 16 until caliper arm 54 touches the top side of the tire. The outside diameter of the tire is then read off from the graduated scale 48 at the exact point designated by pointer 74. If the tire is more than one-eighth inch different in diameter from another tire with which it would be used, the tire is discarded and another is gauged until one is found within the one-eighth inch range. Tires can thus be matched up in pairs, until all of the matching tires have been used.

If it is desired to clamp the head 56 at a selected position, the clamping screw 62 is tightened up, which causes the split center portion of the head to be clamped tightly about post 16. If the scale 48 has to be replaced, or if the device 10 should be dropped or otherwise strained or damaged, it can be re-calibrated by merely clamping the head 56 at one position; accurately measuring the distance from the top surface of base plate 12 to the underside of caliper arm 54; and adjusting the pointer arm 74 up or down to read the correct distance on scale 48. This is done by loosening set screw 76 and sliding rod 72 up or down through crosspiece 70 before tightening the set screw again.

A second embodiment of the invention, shown in FIGS. 7 to 9, inclusive, is used for checking the roundness of tires. In this embodiment, parts that are substantially identical to corresponding parts of the embodiment in FIGS. 1 to 6 are give the same reference numerals as in the latter, but with a prime (') suffix.

The constuction of apparatus 10' is similar to the previously described apparatus 10, except that the base plate 12' has two laterally spaced, parallel rollers 80 mounted on its top surface, said rollers being in a plane normal to the post 16' and located symmetrically on opposite sides thereof. Each of the rollers 80 is supported at one end by an angle bracket 81, which is pivoted on the plate 12' for swinging movement. The opposite end of each roller is supported by another angle bracket 82, which slides over the surface of plate 12' and is secured thereto in the position shown in FIG. 8 by means of a pin projecting upwardly from the surface of the plate, that seats in a hole provided in the angle bracket 82. Thus, the two rollers 80 can be swung 90° from the positions shown in FIG. 8, after which the apparatus can be used in the manner described for the embodiment of FIGS. 1 to 6, to measure the outside diameter of a tire.

When the rollers 80 are parallel to one another, as in FIG. 8, a tire can be placed on the rollers and turned freely on them. The rollers lift the tire clear of the base plate 12', and cradle the tire between them. Prior to turning the tire on the rollers 80, the sliding head 56' is moved up or down on post 16' to bring the caliper arm 83 into contact with the top of the tire. The tire is then rotated slowly on the rollers, and the head 56' is held down lightly toward the tire, so that the caliper arm just rests on the tread surface of the tire, moving up and down to follow any out-of-roundness of the tire. The movement of the pointer 74' along the scale 48' is noted, and the maximum and minimum readings are taken down, a difference of more than one-eighth inch is usually considered justification for having the tire trued up on a tread-shaving machine.

To enable it to lie against the tread while the tire is being turned, the caliper arm 83 is made with a central, round tube 84, one end of which is inserted into a short length of pipe 85. Pipe 85 abuts at one end against the outside of sleeve 56' and is welded thereto. Two triangular gusset plates 86 are fitted into the top and bottom corners formed by the pipe 85 and sleeve 56' and are welded in place to brace the caliper arm. Rotatably mounted on the projecting end of tube 84 is a cylindrical sleeve 87, which forms the outer surface of the caliper arm. Washers 88 at each end of the sleeve provide smooth end bearings for the latter, and a grease fitting 89 is screwed into the outer end of the tube 84 to retain the sleeve and washers. Holes are provided in the wall of the tube so that grease injected through fitting 89 can get into the clearance between the tube and the sleeve 85.

A third form of the invention, shown in FIGS. 10–14, inclusive, is portable so that it can be carried in the cab of a truck. In this embodiment, parts that correspond to those described in connection with FIGS. 1 to 6 have the same reference numerals as in the latter case, but with the double prime (") suffix.

The tire caliper of FIGS. 10 to 14 is designated in its entirety by reference numeral 10", and comprises two parallel posts 14" and 16", which are connected together at both ends by bridge members 34". There is a tubular head 56" slidably mounted on post 16", and carried by this head is a pointer 74" that cooperates with graduated scale 48" on post 14" to give the outside diameter of a tire. Pivotally mounted on head 56" for swinging movement between the working position shown in solid lines in FIG. 10, and the transport position shown in broken lines, is a caliper arm 90.

At the left-hand end of the device, as seen in FIG. 10, is a second caliper arm 91, which is also pivoted at 92 for swinging movement between the working position shown in solid lines and the folded transport position shown in broken lines. Caliper arm 91 is the equivalent of the base plate 12 in the embodiment of FIGS. 1—4, and its function is to make contact with one side of a tire, while the other caliper arm 90 makes contact with the other side.

The portable tire caliper 10" is intended to be hand-held, so that it can be used to measure the diameters of tires mounted on the truck axles. To this end, handles 93 and 94 are provided. Handle 93 is mounted on and bridges the gap between posts 14", 16" near one end thereof, while handle 94 is mounted on one side of head 56". One end of handle 94 is connected to one of the guide arms 68", and the other end is connected to one of another pair of guide arms 95 which are fixed to the end of head 56" remote from arms 68". Guide arms 95 pass on opposite sides of post 14" and slidably engage the latter.

Between handle 93 and the left-hand end of the posts 14", 16" is a flat bearing plate 96 which is attached to post 16" and braced with respect thereto by bracing struts 100. Bearing plate 96 is placed flat against the outside wall of the tire being measured, and this keeps the caliper arms 90 and 91 perpendicular to the plane of the tire walls.

As best shown in FIG. 14, caliper arm 90 comprises a length of steel tubing having a plug 101 inserted into one end thereof. Plug 101 is connected by a pivot bolt 102 to a bracket 103 fixed to one side of head 56". Swinging movement of the caliper arm 90 in the clockwise direction (FIG. 14) is limited by a limit stop screw 104, which is locked by a lock nut 105. Screw 104 can be adjusted to make arm 90 exactly perpendicular to post 16"which is necessary for accurate measurement.

To measure the smaller tire of a dual pair, means 108 is provided on the caliper arm to show the amount by which the smaller tire is undersize with respect to the larger. The said means comprises a sleeve 106 which is slidable and rotatable in the cylindrical tube 90. A spring wire 107 extends lengthwise of sleeve 106 and lies in a slot 110 provided in one side thereof, and one portion of spring wire 107 slides in one of four lengthwise-extending grooves 111 formed in the four sides of tube 90. Spring wire 107 thus serves to keep sleeve 106 from turning on tube 90, yet at the same time allows sleeve 106 to be forcibly turned to any one of four positions spaced 90° apart.

Fixed to the sleeve 106 at its midpoint and disposed perpendicularly to the axis of the sleeve is a rectangularly shaped gauge plate 112, which is best seen in FIG. 13. One side of plate 112 is exactly one-sixteenth inch out from the edge of tube 90; the next adjacent side in the clockwise direction is one-eighth inch; the next side one-fourth inch; and the fourth side is three-eighths inch. With the caliper arms 90 and 91 touching the outside of the larger tire on opposite sides thereof, the member 105 is moved into alignment with the smaller tire, as shown in FIG. 10, and sleeve 106 is turned on tube 90 until one side of plate 112 just touches the tread of the smaller tire. The fractional amount shown on the side of plate 112 touching the tire is doubled, and this amount is deducted from the diameter of the larger tire as indicated by the pointer 74" on scale 48", to give the diameter of the smaller tire.

While I have shown and described in considerable detail what I believe to be the preferred forms of my invention, it will be understood by those skilled in the art that various changes may be made without departing from the broad scope of the following claims.

I claim:

1. A tire caliper comprising:

a flat baseplate resting on the ground;

a pair of laterally spaced, parallel posts connected to said baseplate and rising perpendicularly therefrom near one edge of the baseplate;

a bridge member rigidly connecting said posts together at their top ends;

a pair of laterally spaced, parallel rollers rotatably supported on the baseplate and spaced equidistantly from said posts on opposite sides thereof, said rollers providing rolling support for a tire standing thereon;

a graduated scale fixed to one of said posts and extending parallel thereto;

a head slidably mounted on the other of said posts and having a pair of guide arms fixed to opposite sides thereof, said guide arms extending horizontally from the head to slidably engage said one post on opposite sides thereof;

a caliper arm projecting horizontally from said head directly above said rollers and parallel thereto, said caliper arm being disposed midway between said rollers;

each of said rollers being swingable about one end thereof to remove them from positions directly below said caliper arm so as to permit a tire to stand on said baseplate; and a pointer mounted on said head and indicating on said graduated scale the outside diameter of a tire standing on said baseplate and engaged on the top side of its tread surface by said caliper arm;

said caliper arm touching the top side of the tire tread and causing said head to move up and down on said other post as it follows any out-of-roundness of the tire as the tire revolves on said rollers when the latter have been restored to their parallel positions, the amount of out-of-roundness of the tire tread being designated by the difference between the minimum and maximum readings obtained on said graduated scale as the tire revolves.

2. A tire caliper as in claim 1, wherein said caliper arm has a cylindrical sleeve contacting said tire tread surface and rotating about the axis of the sleeve as said tire revolves.

* * * * *